US011527021B2

(12) United States Patent
Ito

(10) Patent No.: US 11,527,021 B2
(45) Date of Patent: Dec. 13, 2022

(54) IMAGE PROCESSING SYSTEM, IMAGE PROCESSING METHOD, AND STORAGE MEDIUM

(71) Applicant: CANON KABUSHIKI KAISHA, Tokyo (JP)

(72) Inventor: Hiroyasu Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/878,030

(22) Filed: May 19, 2020

(65) Prior Publication Data
US 2020/0372691 A1   Nov. 26, 2020

(30) Foreign Application Priority Data
May 23, 2019 (JP) .............................. JP2019-097145

(51) Int. Cl.
*G09G 5/00* (2006.01)
*G06T 11/00* (2006.01)
*H04N 5/247* (2006.01)
*H04N 5/265* (2006.01)

(52) U.S. Cl.
CPC ........... *G06T 11/001* (2013.01); *H04N 5/247* (2013.01); *H04N 5/265* (2013.01)

(58) Field of Classification Search
CPC ....... G06T 19/006; G06T 19/00; G06F 3/011; G06F 3/012; G02B 27/017
USPC .......................................................... 345/633
See application file for complete search history.

(56) References Cited

U.S. PATENT DOCUMENTS

| 2008/0192116 | A1* | 8/2008 | Tamir ...................... G06T 7/292 |
| | | | 348/157 |
| 2009/0315978 | A1* | 12/2009 | Wurmlin ................... G06T 7/20 |
| | | | 348/43 |
| 2015/0054823 | A1* | 2/2015 | Dzhurinskiy ........... G06T 15/04 |
| | | | 345/419 |
| 2018/0089842 | A1* | 3/2018 | Mizuno ................. G06T 15/205 |
| 2019/0356906 | A1* | 11/2019 | Handa ................... G06T 15/205 |

FOREIGN PATENT DOCUMENTS

| EP | 3361724 A2 | 8/2018 |
| JP | 2017212593 A | 11/2017 |
| WO | 2018/070121 A1 | 4/2018 |

* cited by examiner

*Primary Examiner* — Gordon G Liu
(74) *Attorney, Agent, or Firm* — Canon U.S.A., Inc. IP Division

(57) ABSTRACT

The present invention is directed to solving an issue arising when a background image is generated. An image processing system generates a foreground image containing a foreground object based on an image captured by an imaging apparatus included in a first imaging apparatus group. The image processing system generates a background image not containing the foreground object based on an image of the imaging region captured by an imaging apparatus included in a second imaging apparatus group different from the first imaging apparatus group. The image processing system generates a virtual viewpoint image based on the generated foreground image and background image.

25 Claims, 13 Drawing Sheets

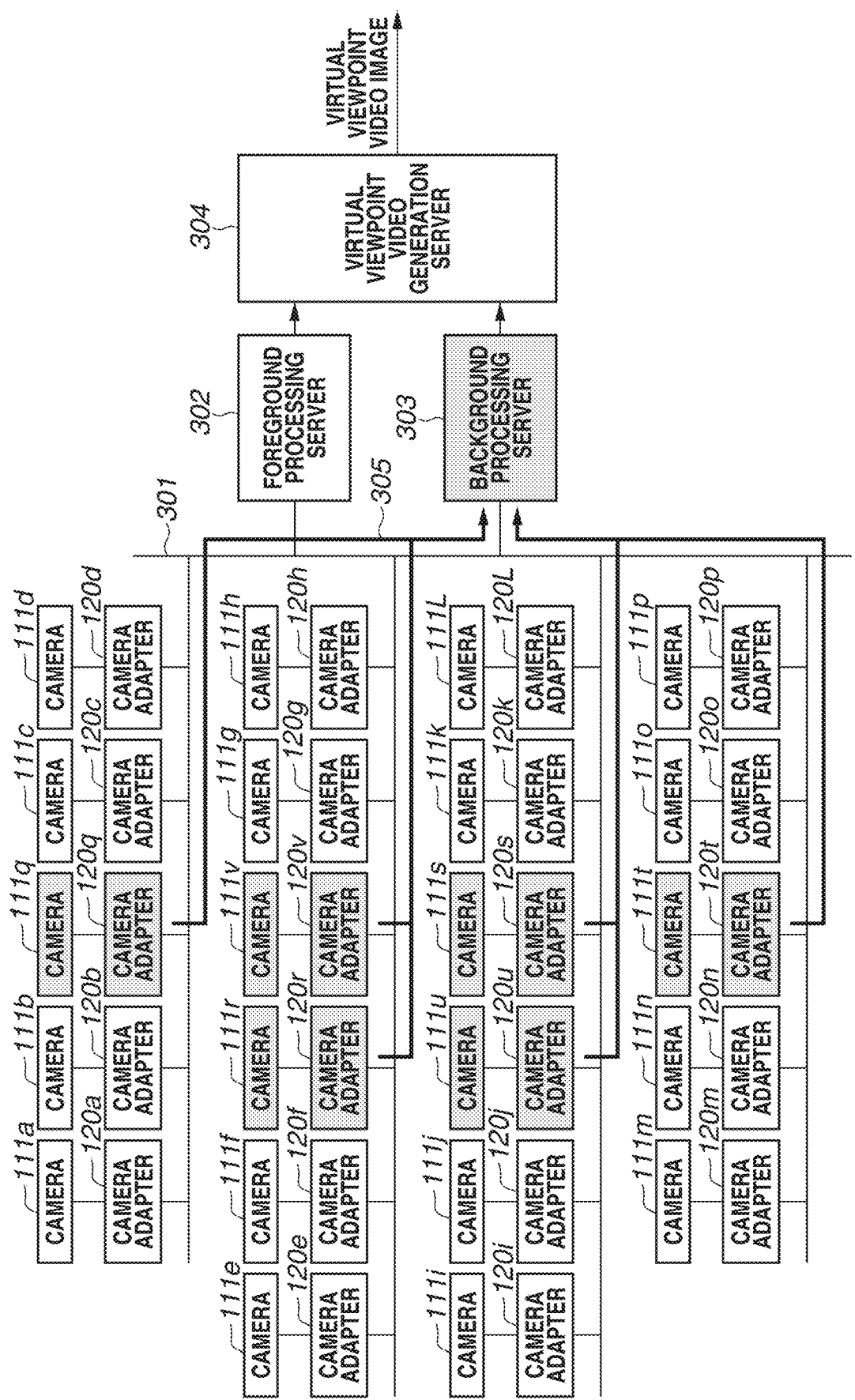

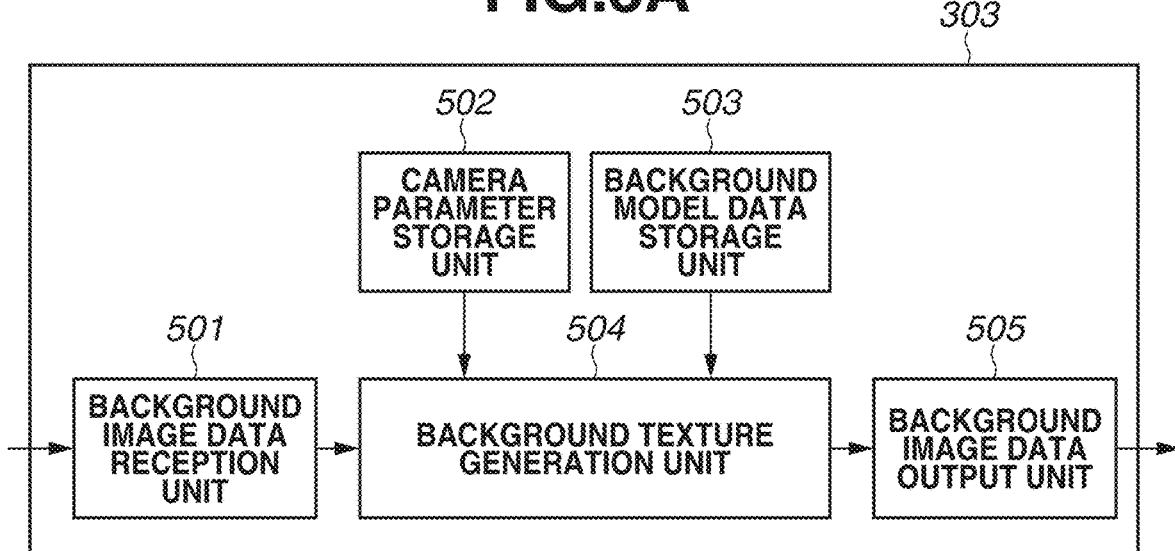
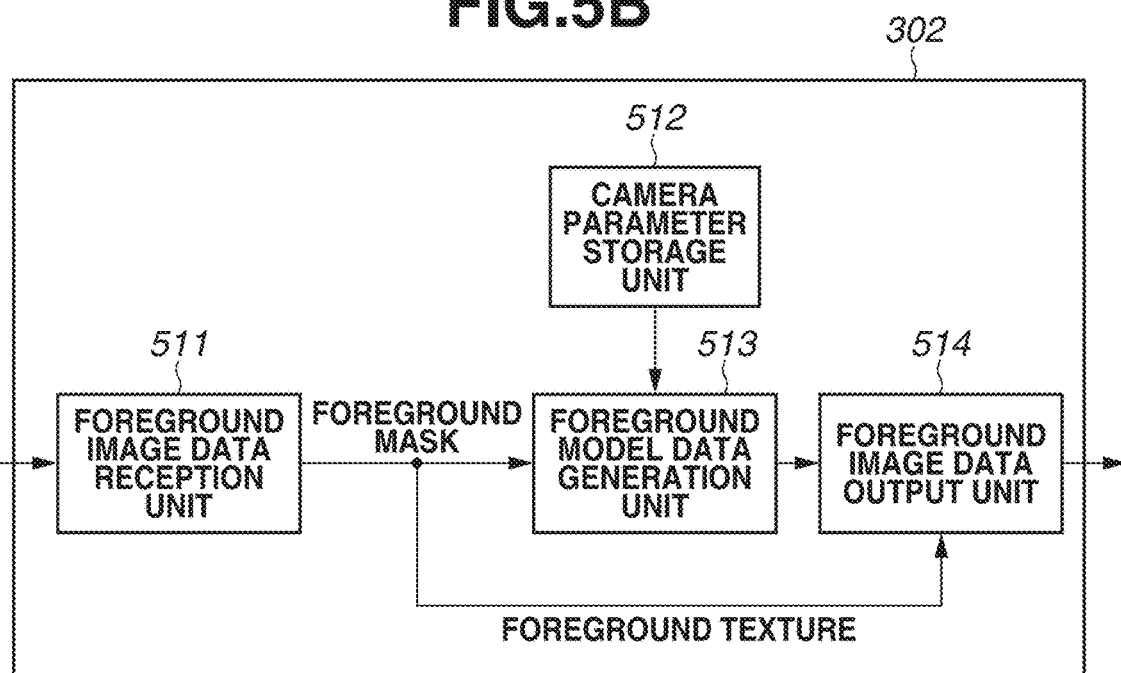

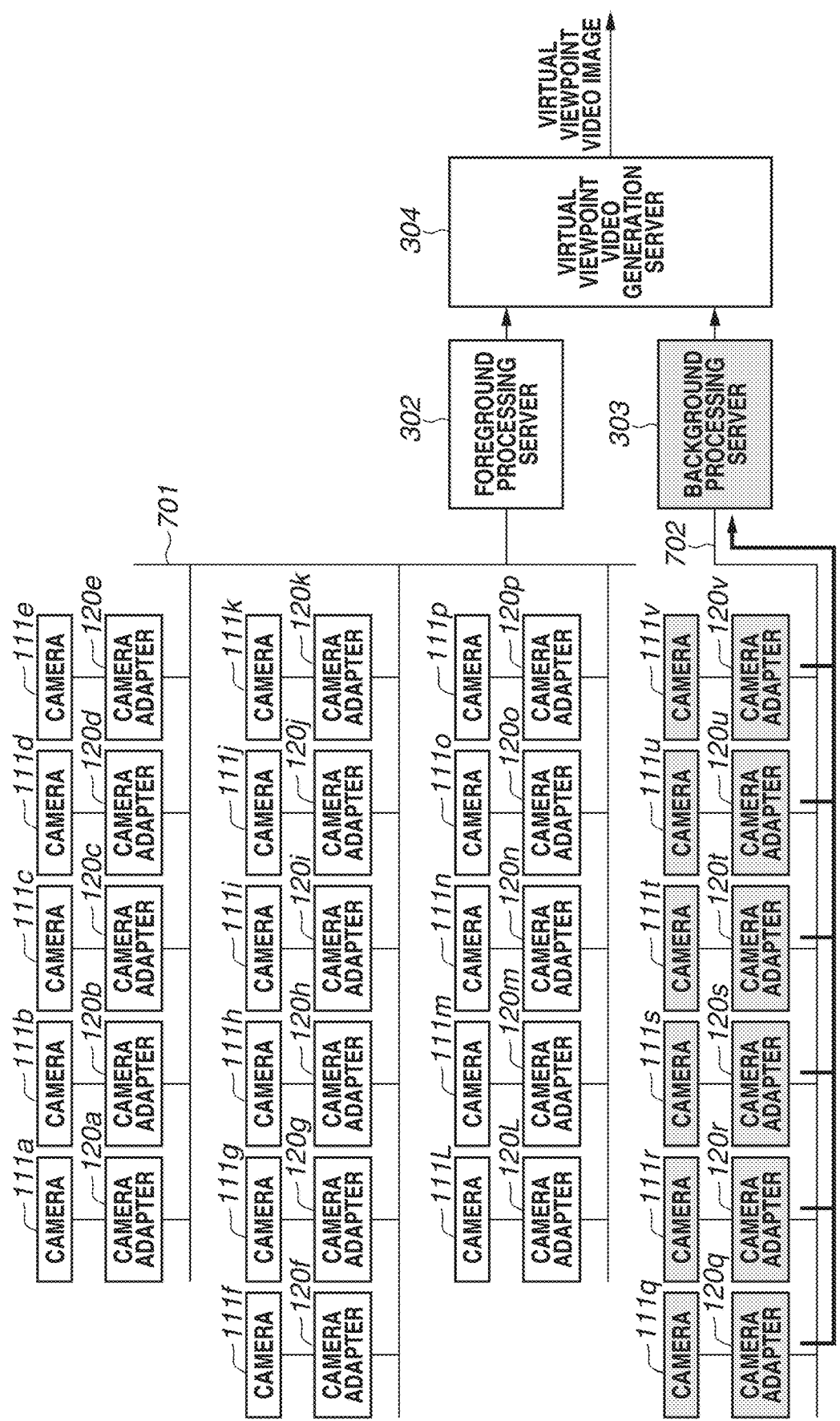

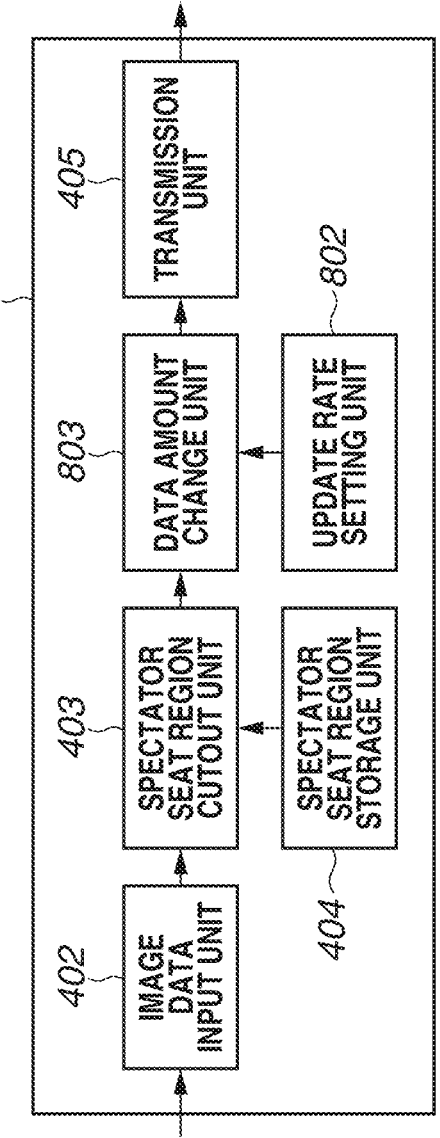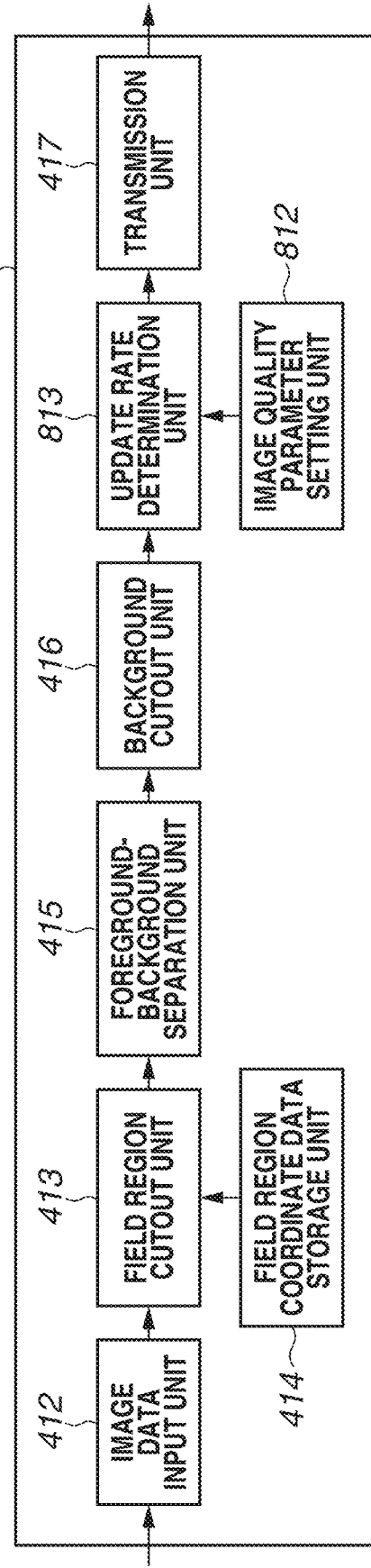

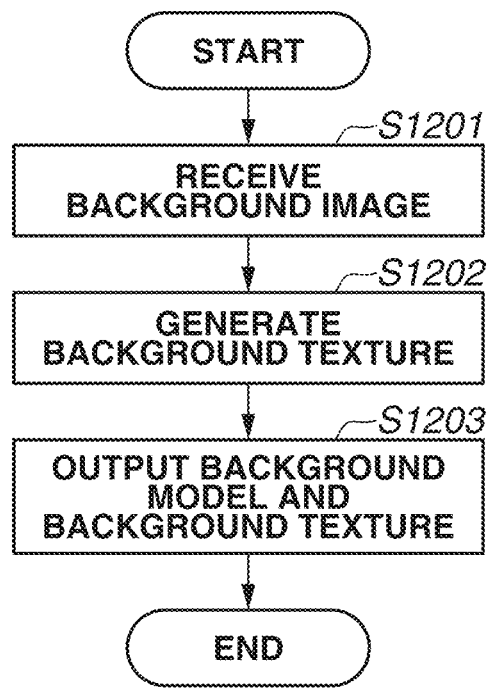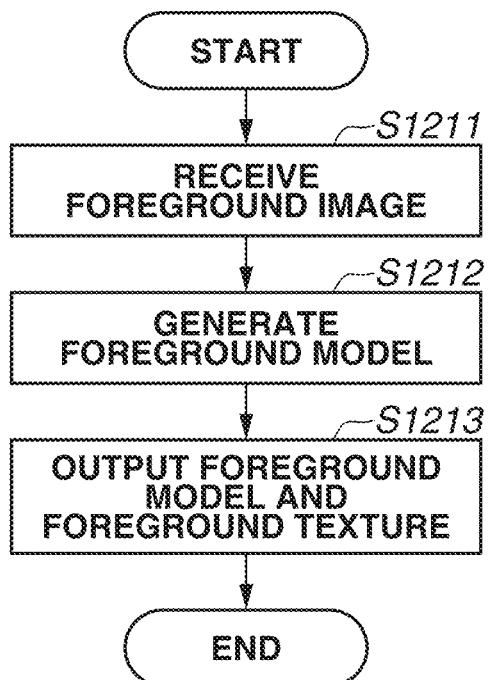

IMAGE PROCESSING SYSTEM, IMAGE PROCESSING METHOD, AND STORAGE MEDIUM

BACKGROUND OF THE INVENTION

Field of the Invention

The present invention relates to an image processing system that generates a virtual viewpoint image according to a virtual viewpoint.

Description of the Related Art

In these days, attention is attracted to a technique that captures images from a plurality of viewpoints in synchronization with one another with a plurality of cameras (imaging apparatuses) set up at different positions, and generates a video image (a virtual viewpoint video image) from an arbitrary virtual camera (a virtual viewpoint) using a plurality of images acquired from the image capturing (Japanese Patent Application Laid-Open No. 2017-212593). According to such a technique, it becomes possible to view, for example, a highlight scene in soccer and basketball from various angles, and becomes possible to provide high realistic sensations to users compared to an ordinary video content.

Japanese Patent Application Laid-Open No. 2017-212593 discusses that a foreground image containing a moving object such as a person and a background image not containing the object are generated from the images captured by the plurality of cameras, and the virtual viewpoint image is generated from the generated foreground image and background image.

It is desirable to capture the images from various directions using a further larger number of cameras to generate a high-quality virtual viewpoint age. On the other hand, generating the background image based on the images captured from the various directions using the large number of cameras may lead to generation of an undesirable image to the contrary. For example, imaging a lawn field in a stadium from different directions may result in the lawn field looking brighter or darker in the images depending on the positions of the cameras even though the same location is imaged, thereby leading to generation of captured images with a difference lying in brightness and hue among them. If background regions are cut out from this plurality of captured images having a difference in brightness and hue and are combined with one another, this undesirably leads to generation of a background image colored patchily as a whole. A conceivable result therefrom is that the generated virtual viewpoint video image unintentionally contains the patchily colored background, thereby ending up as an image that makes the users feel strange.

Further, if the system is configured in such a manner that both the foreground image and the background image are generated by each image processing apparatus connected to each of the plurality of cameras, a heavier processing load is undesirably imposed on each image processing apparatus.

SUMMARY OF THE INVENTION

The present invention is directed to solving at least one of the above-described issues.

According to an aspect of the present invention, an image processing system includes a first generation unit configured to generate a foreground image containing a foreground object based on an image of an imaging region captured by an imaging apparatus included in a first imaging apparatus group, a second generation unit configured to generate a background image not containing the foreground object based on an image of the imaging region captured by an imaging apparatus included in a second imaging apparatus group different from the first imaging apparatus group, and an image generation unit configured to generate a virtual viewpoint image according to a virtual viewpoint based on the foreground image generated by the first generation unit and the background image generated by the second generation unit.

Further features of the present invention will become apparent from the following description of exemplary embodiments with reference to the attached drawings.

BRIEF DESCRIPTION OF THE DRAWINGS

FIG. 3 illustrates an example of a system configuration of an image processing system.

FIGS. 5A and 5B are functional block diagrams illustrating configurations of a background processing server and a foreground processing server, respectively.

FIG. 7 illustrates an example of a system configuration of an image processing system according to a second exemplary embodiment.

FIGS. 8A and 8B are functional block diagrams illustrating configurations of camera adapters according to a third exemplary embodiment.

FIGS. 12A and 12B are flowcharts illustrating processing procedures performed by the background processing server and the foreground processing server, respectively.

DESCRIPTION OF THE EMBODIMENTS

In the following description, embodiments of the present invention will be described with reference to the drawings. However, configurations that will be described in the following embodiments are mere examples, and are not intended to limit the present invention to the described embodiments.

A first embodiment will be described regarding an example of an image processing system that captures images with a plurality of cameras (imaging apparatuses) set up in a facility such as a sports arena (a stadium), and generates a virtual viewpoint image using a plurality of images acquired from this image capturing. The present image processing system is a system that generates a virtual viewpoint image indicating how an imaging target is viewed from a specified virtual viewpoint based on a plurality of images based on image capturing by the plurality of imaging apparatuses and the specified virtual viewpoint. The virtual viewpoint image in the present embodiment is an image that is also called a free viewpoint video image, but is not limited to an image corresponding to the viewpoint freely (arbitrarily) specified by a user and includes, for example, even an image corresponding to a viewpoint selected by the user from a plurality of candidates. Further, specifying the virtual viewpoint is not limited to when the virtual viewpoint is specified by a user operation, and the virtual viewpoint may be specified automatically based on, for example, a result of an image analysis. Further, the image processing system will be described focusing on an example in which the virtual viewpoint image is a moving image in the present embodiment, but the virtual viewpoint image may be a still image.

Figure 1:
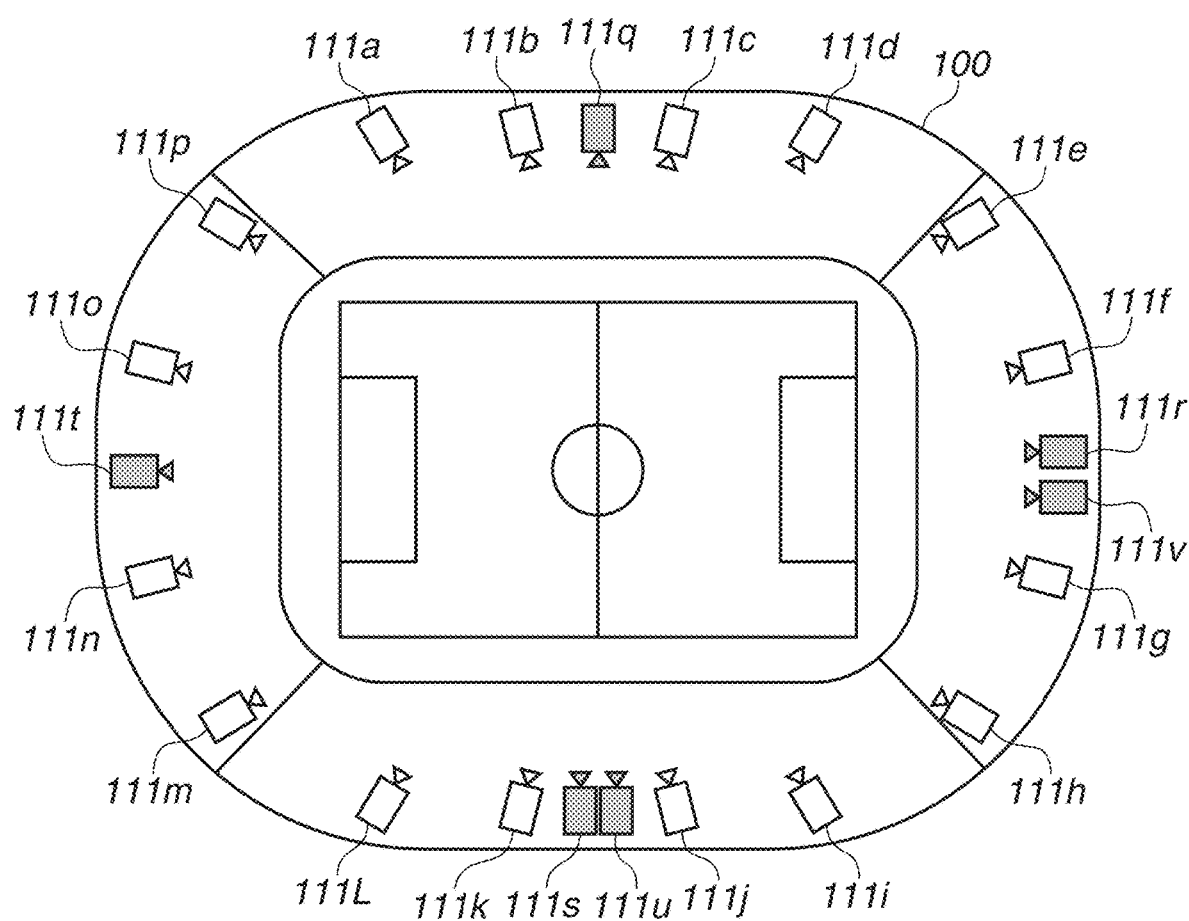
FIG. 1 illustrates an example of a plurality of camera layout.

FIG. 1 illustrates an example of a plurality of camera layout for imaging soccer in the image processing system according to the present embodiment. The soccer will be cited as an example in the present embodiment, but the soccer is an example of the imaging target and the imaging target may be another sports event, a concert, a play, or the like.

FIG. 1 illustrates a stadium 100, and 22 cameras 111a to 111v are laid out so as to surround a field 101 where a game is played. The plurality of cameras 111a to 111v is set up at different positions from one another so as to surround such an imaging region, and captures images in synchronization with one another.

The cameras 111a to 111p among the 22 cameras are a first imaging apparatus group and are foreground imaging cameras for imaging objects serving as a foreground, such as a player, a referee, and a ball, and are set up so as to be able to image the field 101 where the objects are placed, from a plurality of directions. The cameras 111q to 111v are a second imaging apparatus group and indicate background imaging cameras, and are set up so as to be able to image a background region, such as spectator seats and the field 101. Each of the background imaging cameras 111q to 111v is set to a wide angle of view so as to be able to image a wider range than each of the foreground imaging cameras 111a to 111v. This setting allows the image processing system to image the entire background region thoroughly even with a small number of cameras.

As will be used herein, the foreground image refers to an image acquired by extracting the region of the foreground object (a foreground region) from the image captured by the camera. The foreground object extracted as the foreground region refers to an active object (a moving object) on the move (the absolute position or the shape thereof is changeable) when it is chronologically imaged from the same direction. The foreground object is a person such as a player or a referee present in the field 101, a ball, or the like.

The background image refers to at least an image of a region different from the object serving as the foreground (a background region). More specifically, the background image is an image with the object serving as the foreground removed from the captured image. Further, the background refers to an imaging target stationary or continuously kept in an almost stationary state when it is chronologically imaged from the same direction. Such an imaging target is the field 101 where the game is played, the spectator seats, a structure such as a goal used in a ball game, and the like. However, the background is a region at least different from the foreground object, and another object or the like may be contained in addition to the foreground object and the background as the imaging target.

Figure 2A:
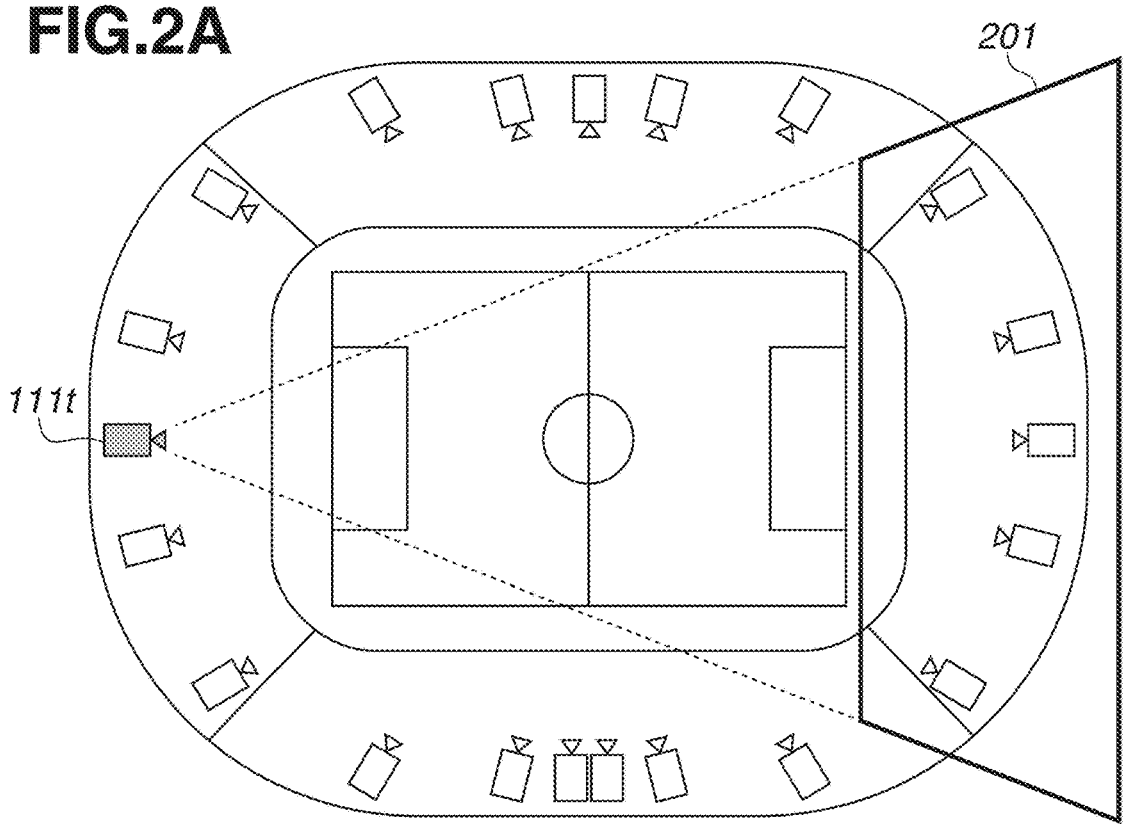
FIGS. 2A and 2B illustrate examples of imaging ranges.
Figure 2B:
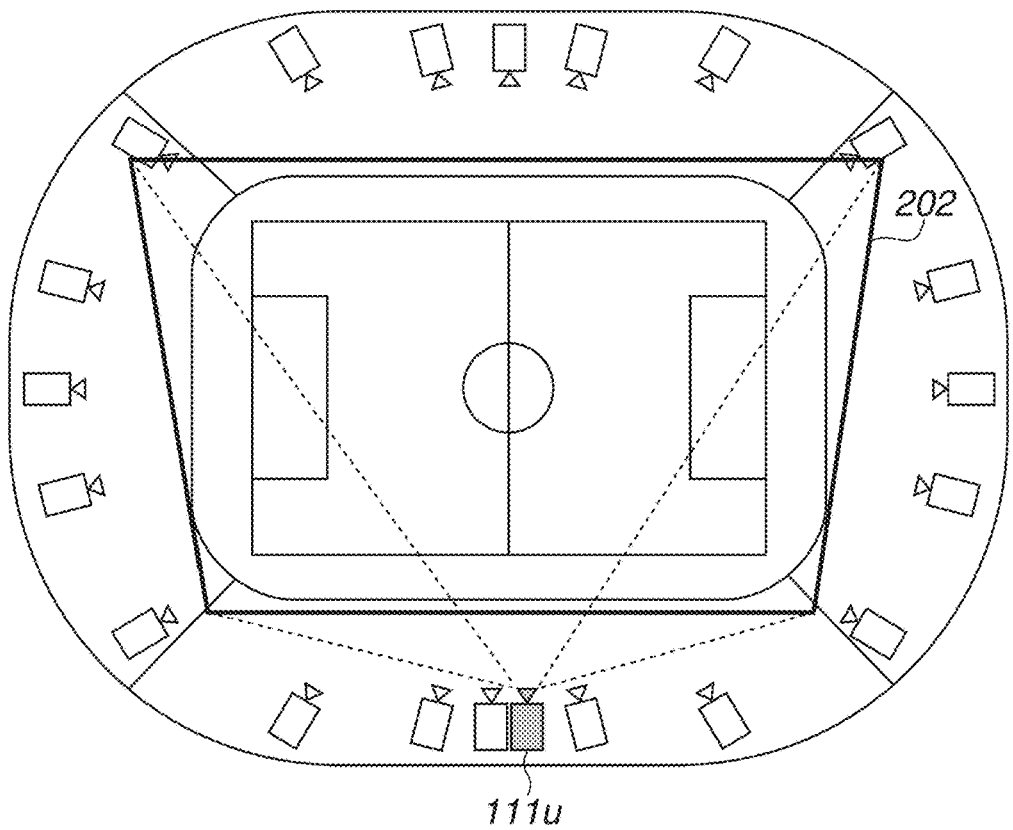

The cameras 111q to 111t are cameras for imaging the spectator seats, and FIG. 2A illustrates an imaging range 201 of the camera 111t as an example thereof. Further, the camera 111u is a camera for imaging the field 101, and FIG. 2B illustrates an imaging range 202 thereof. The camera 111v is a camera for imaging the sky.

In this manner, each of the cameras 111q to 111v for imaging the background region is configured to cover a wide imaging range by setting a camera parameter so as to have a wider angle of view than each of the cameras 111a to 111p for imaging the foreground region. This configuration allows the image processing system to image the entire background region with a number of cameras smaller than the cameras for imaging the foreground region. Further, the image processing system is configured to minimize the number of cameras in charge of imaging each region regarding different types of regions such as the spectator seats, the field 101, and the sky. This configuration allows the image processing system to reduce a possibility that the background image is generated in a patchy color as a whole even when combining background images generated based on the images captured by the respective cameras.

FIG. 3 illustrates an example of a system configuration of the image processing system according to the present embodiment.

The cameras 111a to 111v are the above-described cameras, and are connected to camera adapters 120a to 120v, respectively. In the present embodiment, assume that frame rates of the cameras 111a to 111v are 60 frames per second (fps). In other words, each of the cameras 111a to 111v captures images corresponding to 60 frames in one second.

The camera adapters 120a to 120v are image processing apparatuses that process the captured images captured and input by the cameras 111a to 111v, respectively. The camera adapters 120a to 120p each extract the foreground image from the input captured image and transmit foreground image data to a foreground processing server 302 (first generation means) connected via a network 301. The camera adapters 120q to 120v each extract the background image from the input captured image and transmit background image data to a background processing server 303 (second generation means) connected via the network 301. In the example illustrated in FIG. 3, the camera adapters 120a to 120p for the foreground processing and the camera adapters 120q to 120v for the background processing are arranged in the same network topology. For example, the camera adapters 120a to 120d for the foreground processing and the camera adapter 120q for the background processing are connected to the same network cable via a bus connection.

The foreground processing server 302 performs processing for generating a foreground model, which is shape data indicating the three-dimensional shape of the foreground object, based on the received plurality of pieces of foreground image data, and outputs the foreground model to a virtual viewpoint video generation server 304 (image generation means) together with foreground texture data for coloring the foreground model.

The background processing server 303 performs, for example, processing for generating background texture data for coloring a background model, which indicates the three-dimensional shape of the background such as the stadium, based on the received plurality of pieces of background image data, and outputs a result of the processing to the virtual viewpoint video generation server 304.

The virtual viewpoint video generation server 304 generates and outputs a virtual viewpoint video image based on the data input from the foreground processing server 302 and the background processing server 303. The virtual viewpoint image is generated by mapping the texture data to the foreground model and the background model and carrying out rendering according to the virtual viewpoint indicated by viewpoint information. As will be used herein, the viewpoint information for use in the generation of the virtual viewpoint image is information indicating the position and the orientation of the virtual viewpoint. More specifically, the viewpoint information is a parameter set including a parameter indicating the three-dimensional position of the virtual viewpoint, and a parameter indicating the orientation of the virtual viewpoint in each of pan, tilt, and roll directions. The content of the viewpoint information is not limited to the above-described example. For example, the parameter set as the viewpoint information may include a parameter indicating a size of a field of view (an angle of view) of the virtual viewpoint. The viewpoint information may include a plurality of parameter sets. For example, the viewpoint information may be information including a plurality of parameter sets respectively corresponding to the plurality of frames forming the moving image that is the virtual viewpoint image, and indicating the respective positions and orientations of the virtual viewpoint at a plurality of consecutive time points.

The example illustrated in FIG. 3 indicates an example in which the camera and the adapter are separated from each other, but they may be one apparatus contained in the same housing. Further, the example illustrated in FIG. 3 indicates an example in which the foreground processing server 302 and the background processing server 303 are apparatuses different from each other, but they may be configured as an integrated apparatus. Further, the foreground processing server 302, the background processing server 303, and the virtual viewpoint video generation server 304 may be configured as one apparatus. In this manner, the plurality of functional units illustrated in FIG. 3 may be realized by one apparatus, and one functional unit may be realized by a plurality of apparatuses working in cooperation with one another.

Figure 9:
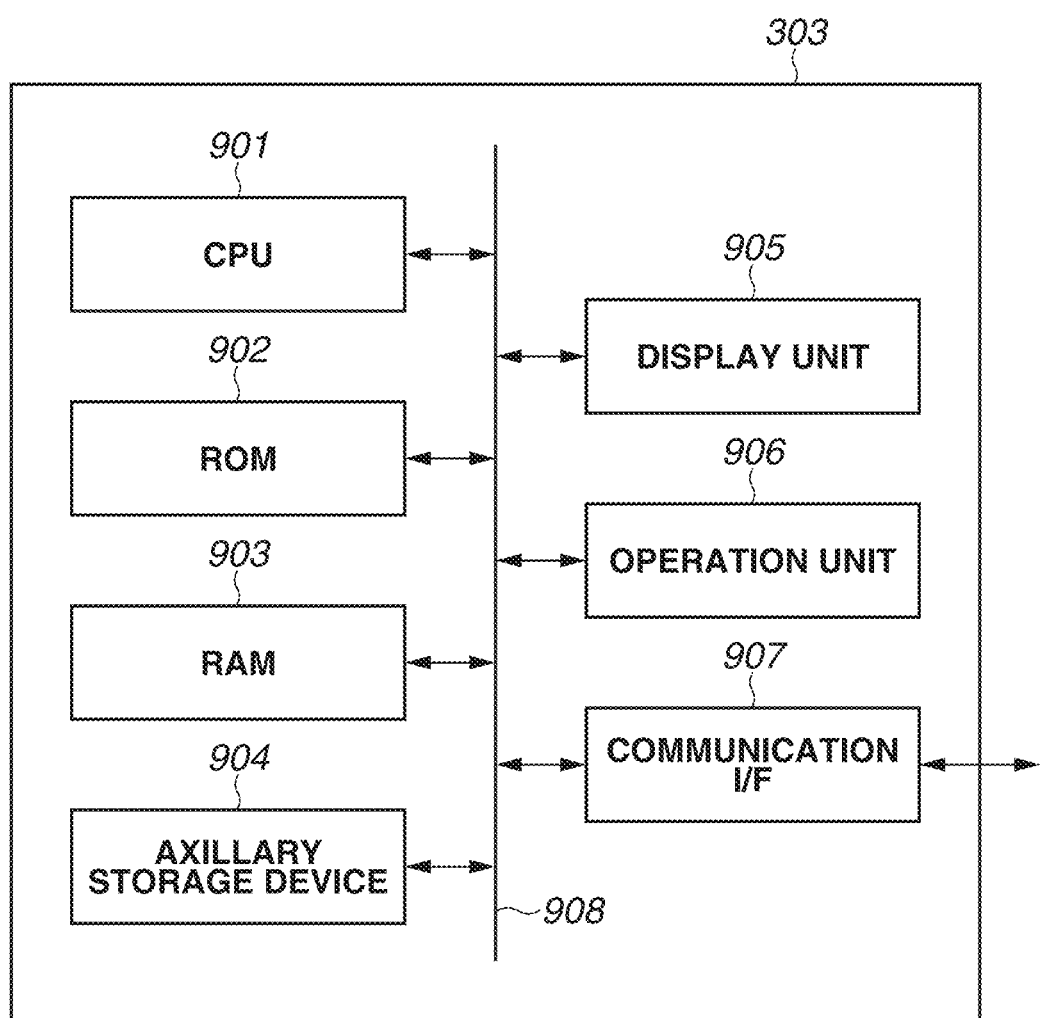
FIG. 9 illustrates a hardware configuration of the background processing server.

Next, a hardware configuration of the background processing server 303 will be described with reference to FIG. 9. The camera adapters 120*a* to 120*v*, the foreground processing server 302, and the virtual viewpoint video generation server 304 also have hardware configurations similar to the hardware configuration of the background processing server 303.

The background processing server 303 includes a central processing unit (CPU) 901, a read only memory (ROM) 902, a random access memory (RAM) 903, an auxiliary storage device 904, a display unit 905, an operation unit 906, a communication interface (I/F) 907, and a bus 908.

The CPU 901 controls the entire background processing server 303 using a computer program and data stored in the ROM 902 or the RAM 903, thereby realizing each of functions that will be described below. The background processing server 303 may include one or a plurality of dedicated hardware devices different from the CPU 901, and cause the dedicated hardware to perform at least a part of the processing supposed to be performed by the CPU 901. Examples of the dedicated hardware include an application specific integrated circuit (ASIC), a field programmable gate array (FPGA), and a digital signal processor (DSP). The ROM 902 stores therein, for example, a program that does not have to be changed. The RAM 903 temporarily stores therein, for example, a program and data supplied from the auxiliary storage device 904, and data supplied from outside via the communication I/F 907. The auxiliary storage device 904 is constructed using, for example, a hard disk drive, and stores therein various kinds of data, such as image data and audio data.

The display unit 905 is constructed using, for example, a liquid crystal display and a light emitting diode (LED), and displays, for example, a graphical user interface (GUI) usable for the user to operate a camera operation terminal 130 (not illustrated). The operation unit 906 is constructed using, for example, a keyboard, a mouse, a joystick and/or a touch panel, and inputs various instructions to the CPU 901 in reaction to an operation performed by the user. The CPU 901 operates as a display control unit that controls the display unit 905, and an operation control unit that controls the operation unit 906.

The communication I/F 907 is used in communication with an external apparatus, such as the camera adapter 120 and the virtual viewpoint video generation server 304. The bus 908 transmits information by connecting each unit in the camera operation terminal 130.

FIGS. 4A, 4B, 4C, and 4D are functional block diagrams illustrating configurations of the camera adapters 120*a* to 120*v*, and FIGS. 11A, 11B, 11C, and 11D are flowcharts illustrating flows of processing procedures performed by the camera adapters 120*a* to 120*v*. The processing performed by each of the camera adapters 120*a* to 120*v* is realized by, for example, the CPU 901 of each of the camera adapters 120*a* to 120*v* executing the program stored in the ROM 902 or the RAM 903.

Figure 4A:
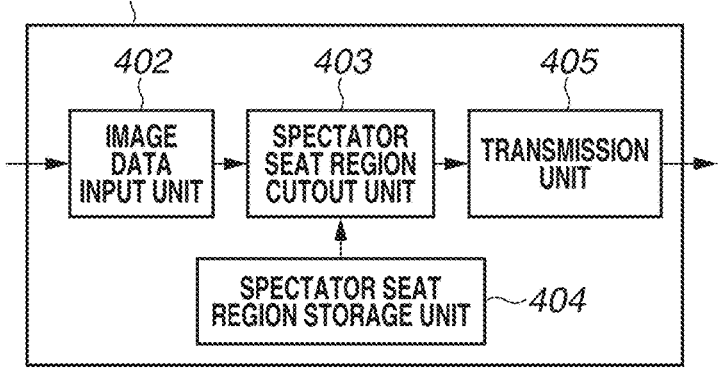
FIGS. 4A, 4B, 4C, and 4D are functional block diagrams illustrating configurations of camera adapters according to a first exemplary embodiment.
Figure 11A:
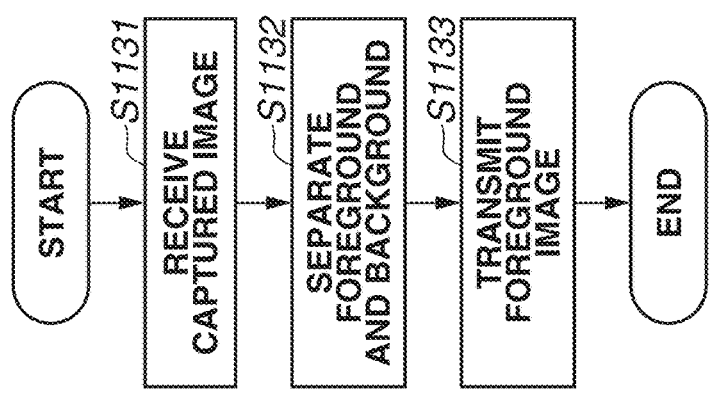
FIGS. 11A, 11B, 11C, and 11D are flowcharts illustrating processing procedures performed by the camera adapters.

FIG. 4A illustrates each of the camera adapters 120*q* to 120*t* for processing the background image of the spectator seat region, and FIG. 11A illustrates a flow of processing performed by each of the camera adapters 120*q* to 120*t*.

A camera adapter 401 functions to cut out the background image of the spectator seat region. In step S1101, an image data input unit 402 receives the captured image data output from the camera. In step S1102, a spectator seat region cutout unit 403 cuts out the image of the spectator seat region in the input captured image. For identification of the spectator seat region, a predetermined region may be identified as the spectator seat region, or the spectator seat region may be automatically identified based on a feature in the image. In the present embodiment, coordinate data of the spectator seat region that is the predetermined region is stored in a spectator seat region storage it 404 in advance. Then, the spectator seat region can be cut out by comparing the stored coordinate and a coordinate in the captured image. In step S1103, a transmission unit 405 transmits the background image data of the cutout spectator seat region to the background processing server 303. Assume that the transmission unit 405 transmits the background image data of the spectator seat region at 30 fps.

Figure 4B:
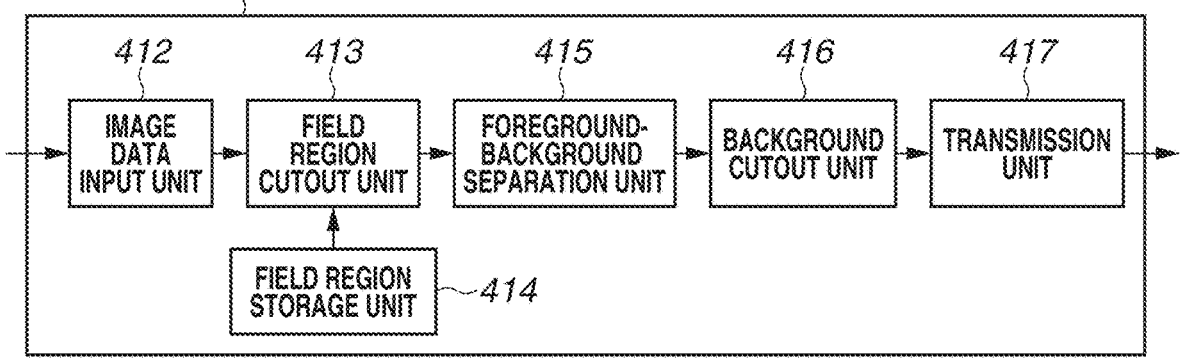
Figure 11B:
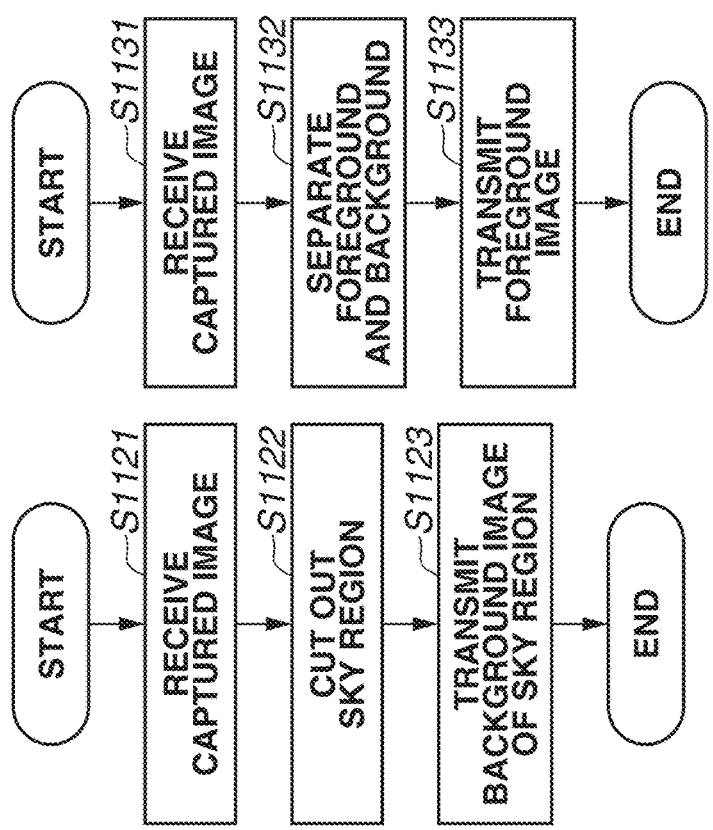

FIG. 4B illustrates the camera adapter 120*u* for processing the image of the field region, and FIG. 11B illustrates a flow of processing performed by the camera adapter 120*u*.

In FIG. 4B, a camera adapter 411 functions to cut out the background image of the field 101. In step S1111, an image data input unit 412 receives the captured image data output from the camera 111*u*. In step S1112, a field region cutout unit 413 cuts out the image of the region corresponding to the field 101 in the input captured image. For identification of the field region, a predetermined region may be identified as the field region, or the field region may be automatically identified based on a feature in the image. In the present embodiment, assume that the field region is cut out by storing coordinate data of the field region that is the predetermined region in a field region storage unit 414 in advance, and comparing the stored coordinate and a coordinate in the captured image.

In step S1113, a foreground-background separation unit 415 performs processing for separating the foreground and the background in the image of the field region by, for example, classifying a moving object as the foreground and a stationary object as the background using images of field regions in a plurality of frames. A background cutout unit 416 cuts out the background image based on a result of the processing performed by the foreground-background separation unit 415. In step S1114, a transmission unit 417 transmits the background image data of the cutout field region to the background processing server 303. Assume that the transmission unit 417 transmits the background image data of the field region at 1 fps.

Figure 4C:
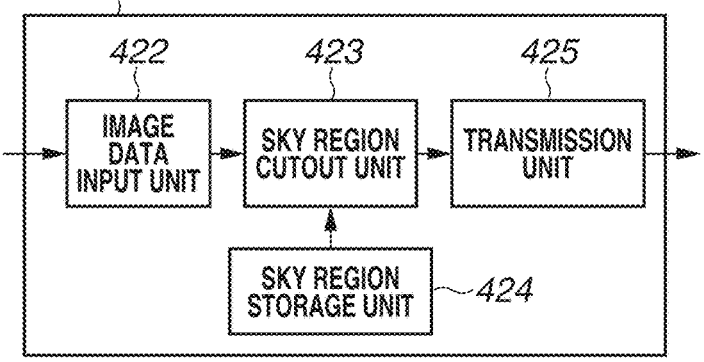
Figure 11C:
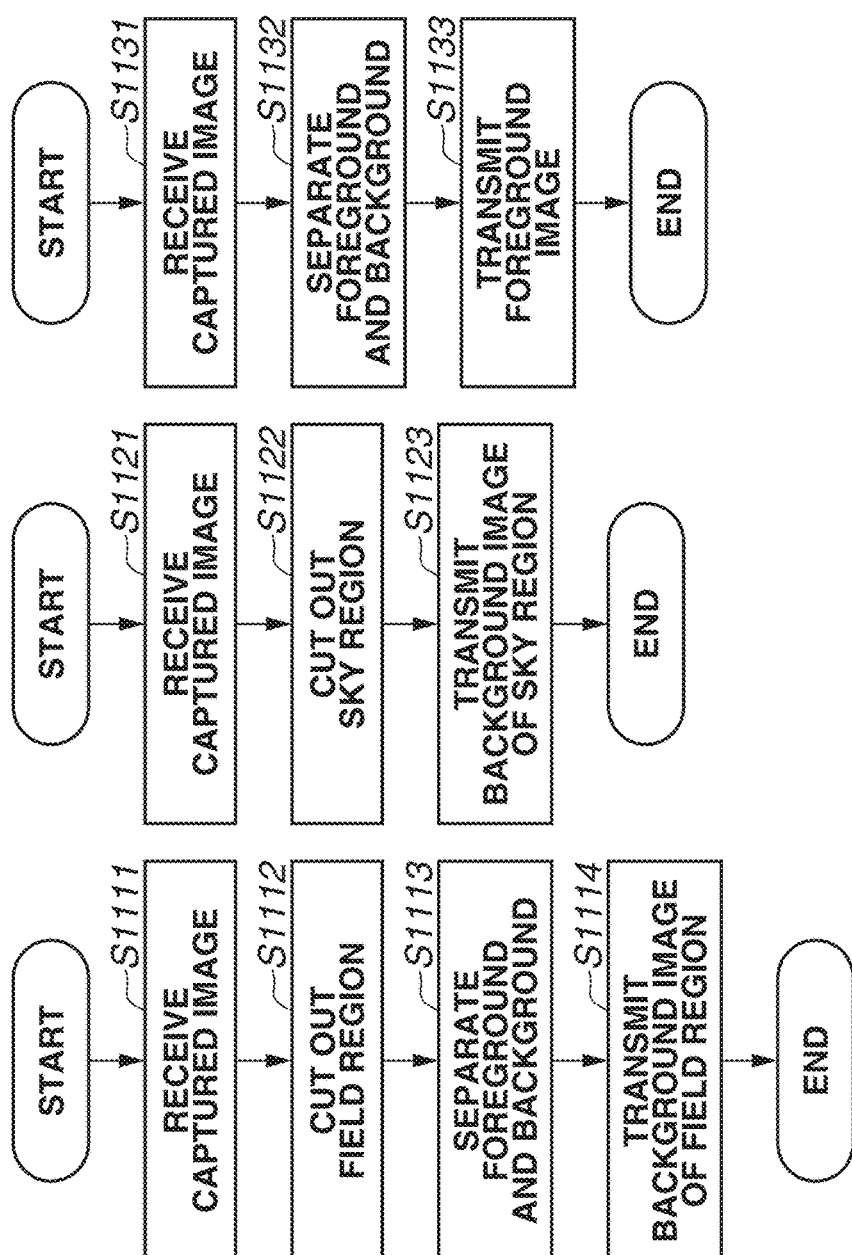

FIG. 4C illustrates the camera adapter 120v for processing the image of the sky region, and FIG. 11C illustrates a flow of processing performed by the camera adapter 120v.

A camera adapter 421 functions to cut out the background image of the sky region. In step S1121, an image data input unit 422 receives the captured image data output from the camera 111v. In step S1122, a sky region cutout unit 423 cuts out the image of the sky region in the input captured image. For identification of the sky region, a predetermined region may be identified as the sky region, or the sky region may be automatically identified based on a feature in the image. In the present embodiment, assume that the sky region is cut out by storing coordinate data of the sky region that is the predetermined region in a sky region storage unit 424 in advance, and comparing the stored coordinate and a coordinate in the captured image. In step S1123, a transmission unit 425 transmits the background image data of the cutout sky region to the background processing server 303. Assume that the transmission unit 425 transmits the background image data of the sky region at a frame rate lower than 1 fps. For example, assume that the transmission unit 425 transmits only one piece of image data per game.

Figure 4D:
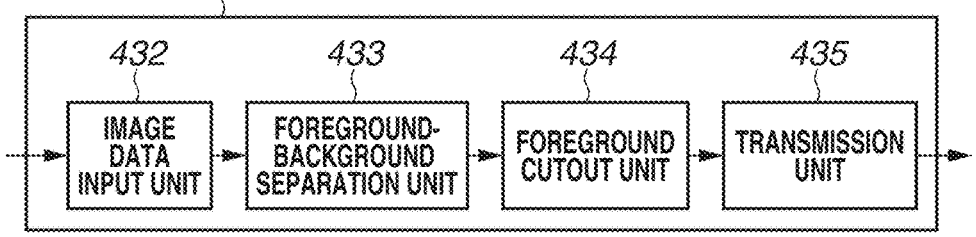
Figure 11D:
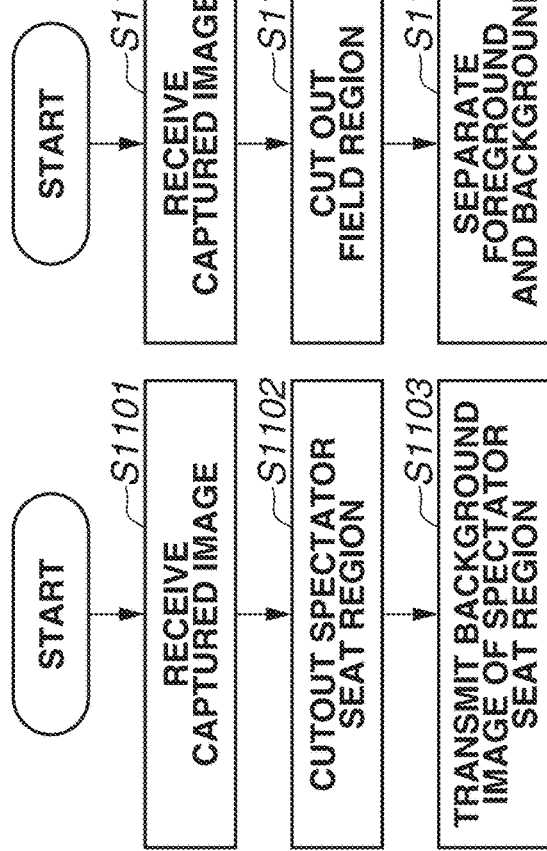

FIG. 4D illustrates each of the camera adapters 120a to 120p for processing the foreground image, and FIG. 11D illustrates a flow of processing performed by each of the camera adapters 120a to 120p.

A camera adapter 431 functions to cut out the foreground image. In step S1131, an image data input unit 432 receives the captured image data output from the camera. In step S1132, a foreground-background separation unit 433 performs processing for separating the foreground and the background in the image by, for example, classifying a moving object as the foreground and a stationary object as the background using images of a plurality of frames. However, the separation processing is not limited thereto, and the foreground and the background may be separated from each other using a technique such as machine learning. A foreground cutout unit 434 cuts out the foreground image based on a result of the processing performed by the foreground-background separation unit 433. In step S1133, a transmission unit 435 transmits the cutout foreground image data to the foreground processing server 302. Assume that the transmission unit 435 transmits the foreground image data at 60 fps.

As described above, the background image is transmitted at a frame rate tower than the frame rate at which the foreground image is transmitted. The reason therefor is as follows. The foreground image containing the moving imaging target such as the player undergoes a considerable change according to the passage of time, and therefore should prevent deterioration of the image quality thereof by being updated at a high frame rate. On the other hand, the background image is less changeable according to the passage of time, and therefore even updating it at a low frame rate little affects the image quality thereof and can contribute to a reduction in a transmission data amount.

Further, the transmission frame rate is changed according to the type of the background image because the field 101 and the sky are less changeable and therefore even a less frequent update thereof suffices while the spectators occupying the spectator seats are often on the move and therefore a relatively frequent update thereof is desirable to generate an image providing a high realistic sensation. In this manner, the image processing system can appropriately update the background by changing the frame rate according to the type of the background region, thereby being able to reduce strangeness that might be felt by the user viewing the virtual viewpoint image.

FIG. 5A is a functional block diagram illustrating the configuration of the background processing server 303, and FIG. 12A is a flowchart illustrating a flow of processing performed by the background processing server 303. The processing performed by the background processing server 303 is realized by, for example, the CPU 901 of the background processing server 303 executing the program stored in the ROM 902 or the RAM 903.

In step S1201, a background image data reception unit 501 receives the background image data transmitted from the camera adapters 120q to 120v. Assume that, when transmitting the foreground image data or the background image data, each of the camera adapters 120a to 120v transmits it after adding an identifier indicating the foreground or the background to, for example, a header of the data. The foreground processing server 302 and the background processing server 303 can receive required data as appropriate by referring to these identifiers.

A camera parameter storage unit 502 stores parameters indicating the positions, the orientations, and the angles of view of the cameras 111q to 111v in advance. The camera parameters may be determined in advance or may be acquired by detecting the states of the cameras 111q to 111v.

A background model data storage unit 503 stores background model data indicating the three-dimensional shapes of the background objects, such as the spectator seats and the field 101, in advance.

In step S1202, a background texture generation unit 504 generates the background texture data that should be affixed to the background model stored in the background model data storage unit 503 using the camera parameters stored in the camera parameter storage unit 503 based on the received background image data.

In step S1203, a background image data output unit 505 outputs the generated background texture data and the background model data stored in advance to the virtual viewpoint video generation server 304.

Figure 6:
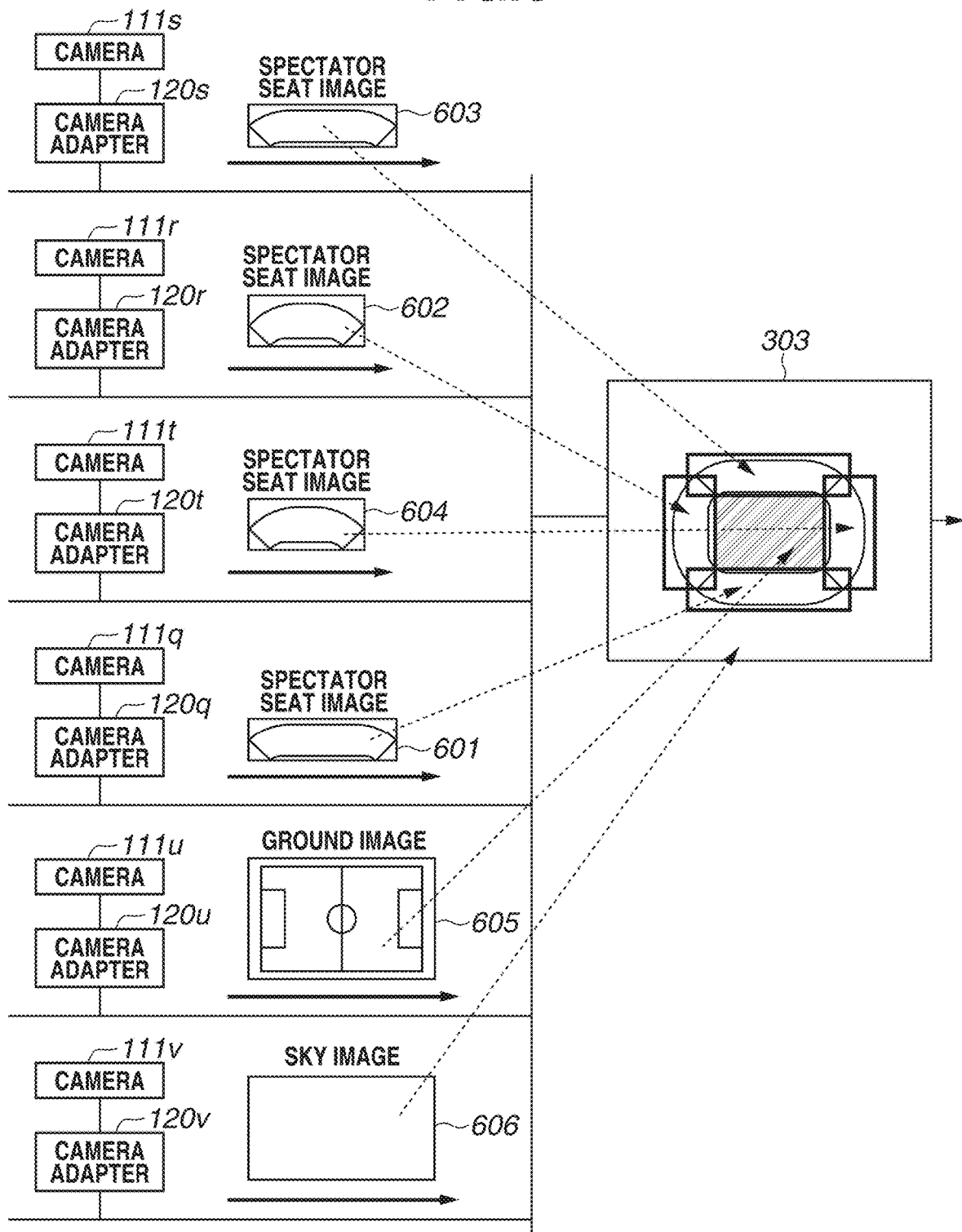
FIG. 6 illustrates a relationship between background images transmitted from the camera adapters and processing performed by the background processing server.

FIG. 6 illustrates a relationship between the background image data transmitted from the camera adapters 120q to 120v and the processing performed by the background processing server 303. FIG. 6 illustrates how the background processing server 303 generates the background texture data based on pieces of background image data 601 to 606 captured by the cameras 111q to 111v and cut out by the camera adapters 120q to 120v, respectively. The background processing server 303 may combine the pieces of background image data 601 to 606 by, for example, extracting each feature point in each of the input images, aligning positions based thereon, and stitching them together.

FIG. 5B is a functional block diagram illustrating the configuration of the foreground processing server 302, and FIG. 12B is a flowchart illustrating flow of processing performed by the foreground processing server 302. The processing performed by the foreground processing server 302 is realized by, for example, the CPU 901 of the foreground processing server 302 executing the program stored in the ROM 902 or the RAM 903.

In step S1211, a foreground image data reception unit 511 receives the foreground image data transmitted from the camera adapters 120a to 120p. The foreground image data received at this time contains a foreground mask image and a foreground texture image.

A camera parameter storage unit 512 stores parameters indicating, for example, the positions, the orientations, and the angles of view of the cameras 111a to 111p in advance. The camera parameters may be determined in advance or may be acquired by detecting the states of the cameras 111a to 111p.

In step S1212, a foreground model data generation unit 513 generates the foreground model data indicating the three-dimensional shape of the foreground object based on the received plurality of foreground mask images and the camera parameters stored in the camera parameter storage unit 512.

In step S1213, a foreground image data output unit 514 outputs the generated foreground model data and the plurality of pieces of foreground texture data received from the camera adapters 120a to 120p to the virtual viewpoint video generation server 304.

Figure 10:
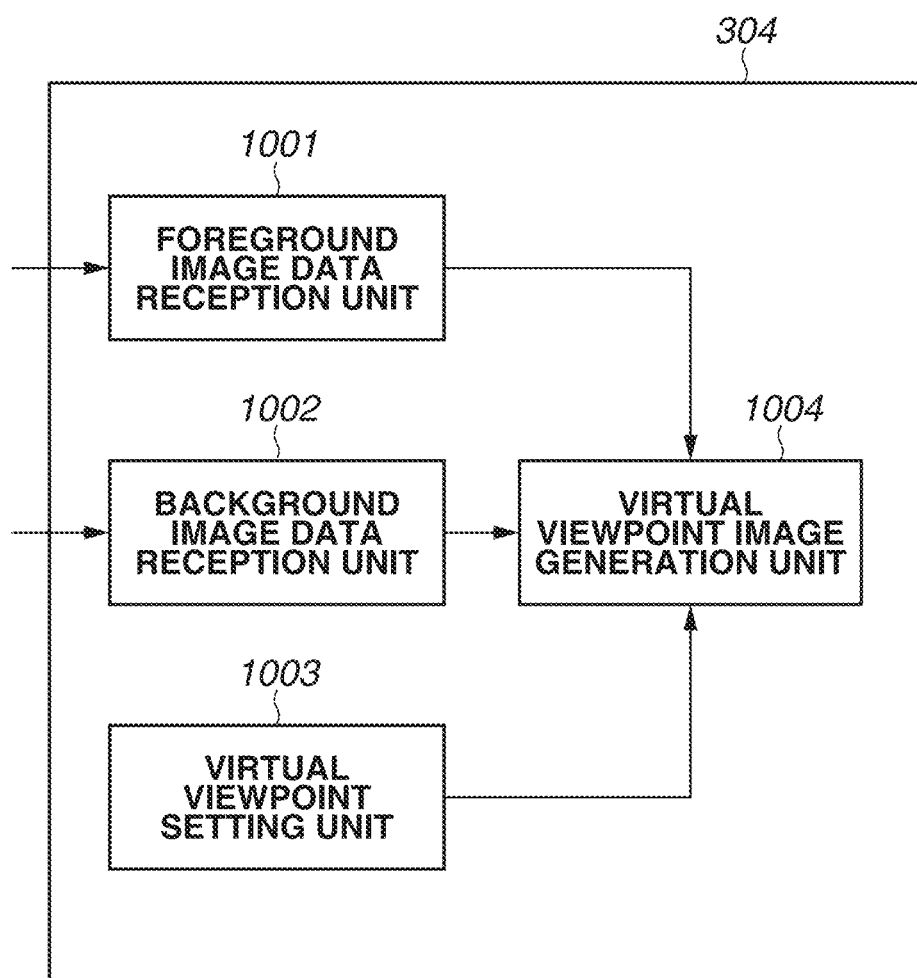
FIG. 10 is a functional block diagram illustrating a configuration of a virtual viewpoint video generation server.
Figure 13:
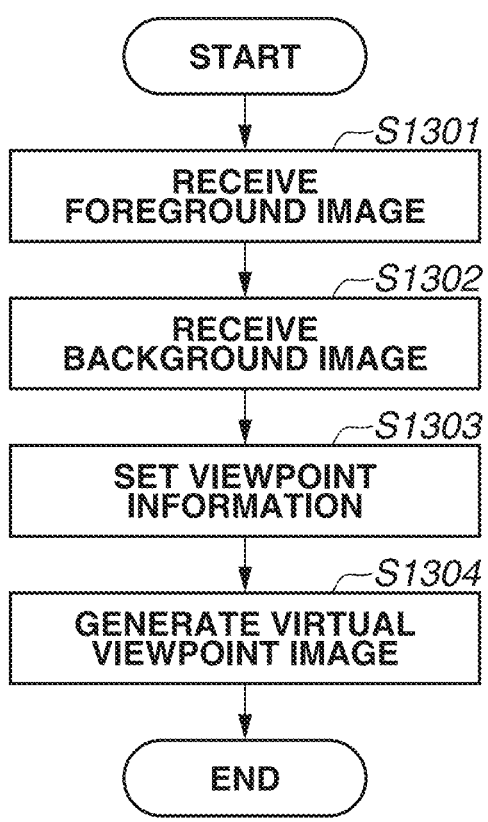
FIG. 13 is a flowchart illustrating processing performed by the virtual viewpoint video generation server.

FIG. 10 is a functional block diagram illustrating the configuration of the virtual viewpoint video generation server 304, and FIG. 13 is a flowchart illustrating a flow of processing performed by the virtual viewpoint video generation server 304. The processing performed by the virtual viewpoint video generation server 304 is realized by, for example, the CPU 901 of the virtual viewpoint video generation server 304 executing the program stored in the ROM 902 or the RAM 903.

In step S1301, a foreground image data reception unit 1001 receives the foreground image data transmitted from the foreground processing server 302. In step S1302, a background image data reception unit 1002 receives the background image data transmitted from the background processing server 303. In step S1303, a virtual viewpoint setting unit 1003 sets the viewpoint information indicating the virtual viewpoint based on, for example, an operation performed by the user.

In step S1304, a virtual viewpoint image generation unit 1004 generates the virtual viewpoint image based on the received foreground image data and background image data and the set virtual viewpoint. As described above, the virtual viewpoint image is generated by mapping the texture data to the foreground model data and the background model data and carrying out the rendering according to the virtual viewpoint indicated by the viewpoint information. The virtual viewpoint image generation unit 1004 generates and updates the virtual viewpoint image at 60 fps. As described above, the background image is less frequently updated because being transmitted at the lower frame rate than the foreground image. For example, an image corresponding to one frame is used regarding the background image of the field region while images corresponding to 60 frames are used regarding the foreground image when virtual viewpoint images corresponding to 60 frames per second are generated. In other words, the background image of the field region corresponding to one frame is also used as the background image of the field region corresponding to the remaining 59 frames.

In this manner, in the present embodiment, the image processing system captures the images using a part of the plurality of cameras as the dedicated cameras for the background and generates the background image based on these captured images, and generates the foreground image based on the images captured by the remaining cameras. Then, the image processing system generates the virtual viewpoint image corresponding to the specified viewpoint information based on the generated foreground image and background image. At this time, the cameras for imaging the background region are set to the wide angle of view so as to be able to image a wider range than the cameras for imaging the foreground region. According thereto, the image processing system is configured to include the number of cameras for imaging the background region smaller than the number of cameras for imaging the foreground region, and minimize the number of cameras for imaging the region of each of the spectator seats, the field 101, the sky, and the like. This configuration allows the image processing system to generate the background image prevented from becoming patchy even when combining the background images generated based on the image capturing by the respective cameras, thereby being able to output an image that the user feels less strange as the finally generated virtual viewpoint image. Further, the image processing system can distribute and reduce the processing load on each of the camera adapters 120a to 120v because each of the camera adapters 120a to 120v does not have to generate both the background image and the foreground image and only has to perform the processing for generating any one of them.

A second embodiment will be described. In the first embodiment, the image processing system has been described referring to the example in which the camera adapters 120a to 120p for the foreground processing and the camera adapters 120q to 120v for the background processing are arranged in the same network topology. On the other hand, the camera adapters 120a to 120p and the camera adapters 120q to 120v can also be arranged in different network topologies.

FIG. 7 illustrates an example of a system configuration when the camera adapters 120a to 120p for the foreground processing and the camera adapters 120q to 120v for the background processing are arranged in the different network topologies.

The cameras 111a to 111v and the camera adapters 120a to 120v are equivalent processing modules compared to the configuration diagram illustrated in FIG. 3, and therefore the same reference numerals will be assigned thereto and descriptions thereof will be omitted here.

The camera adapters 120a to 120p for the foreground processing are connected to a network 701, and transmit the foreground image data to the foreground processing server 302 connected via the network 701. The camera adapters 120q to 120v for the background processing are connected to a network 702, and transmit the background image data to the background processing server 303 connected via the network 702. Configuring the image processing system in this manner allows it to employ a network protocol optimum for each of the camera adapters 120a to 120p for the foreground processing and the camera adapters 120q to 120v for the background processing. For example, in a case where the foreground image data and the background image data are transmitted using User Datagram Protocol/Internet Protocol (UDP/IP) and Transmission Control Protocol/Internet Protocol (TCP/IP), respectively, this configuration brings about an effect of allowing the UDP/IP transmission to be carried out without being affected by TCP/IP. This effect allows the image processing system to generate the background image while reducing a transmission loss of the background image data.

Further, for example, the image processing system may be configured in such a manner that the camera adapters 120a to 120p for the foreground processing are connected via a daisy chain connection, and the camera adapters 120q to 120v for the background processing are connected via a star connection.

A third embodiment will be described. In the first embodiment, the image processing system has been described referring to the example in which the transmission/update frame rates of the background images are set so as to be different according to the characteristics of the background regions, such as the spectator seats and the field 101. Now, the required image quality may be different depending on a destination to which the virtual viewpoint video image is provided and how the virtual viewpoint video image is viewed, and this may raise the necessity of changing the update frame rate and the resolution of each of the background images according thereto. On the other hand, permitting a limitless change in the update frame rate of each of the background images may lead to stringency of the network bandwidth, an increase in the processing load on each server, and the like. For example, in the case where the camera adapters 120q to 120v are connected in the same network as described in the second embodiment, uniformly setting the transmission rates to 30 fps is expected to lead to the stringency of the network bandwidth and thus even result in a failure to complete the transmission in time. Therefore, the present embodiment will be described regarding an example in which the transmission/update frame rate of the background image data of each of the background regions is adjusted in consideration of the overall balance. In the present example, this configuration will be described referring to an example in which the update rate is prioritized over the image quality for the spectator seats because a movement is important in this case, while the image quality is prioritized for the field region image because the visual resolution of a goal line, grass grains, and the like is important in this case.

FIGS. 8A and 8B are functional block diagrams illustrating configurations of the camera adapters 120. FIG. 8A illustrates a camera adapter 801 for processing the image of the spectator seat region, and FIG. 8B illustrates a camera adapter 811 for processing the image of the field region.

The camera adapter 801 is configured in such a manner that an update rate setting unit 802 and a data amount change unit 803 are added to the camera adapter 401 described with reference to FIGS. 4A, 4B, 4C, and 4D. Similar processing blocks to the camera adapter 401 will be identified by the same reference numerals, and descriptions thereof will be omitted here.

The update rate setting unit 802 sets the update frame rate of the background image of the spectator seat region. The transmission frame rate at the transmission unit 405 is also changed according to the update frame rate set here. The update frame rate may be, for example, set by a user operation or dynamically set according to the status of the communication line.

The data amount change unit 803 performs processing for changing the data amount as necessary with respect to the image cut out by the spectator seat region cutout unit 403 based on the update frame rate set by the update rate setting unit 802. For example, if the update frame rate increases to 60 fps, the data amount change unit 803 performs processing for reducing the data amount to be transmitted. The processing for reducing the data amount may be compression processing such as Joint Photographic Experts Group (JPEG) processing or may be processing for reducing the resolution or the tone. The compression ratio or the like may be determined by the data amount change unit 803 calculating, for example, a compression ratio that satisfies the update rate set by the update rate setting unit 802, or may be directly specified by the update rate setting unit 802. Alternatively, a limit may be imposed on the bit depth of the image. For example, the data amount change unit 803 may perform the processing so as to reduce the data amount by quantizing 12-bit image data into 8-bit image data. Further, the data amount change unit 803 may use these methods in combination.

The camera adapter 811 is configured in such a manner that an image quality parameter setting unit 812 and an update rate determination unit 813 are added to the camera adapter 411 described with reference to FIGS. 4A, 4B, 4C, and 4D Similar processing blocks to the camera adapter 411 will be identified by the same reference numerals, and descriptions thereof will be omitted here.

The image quality parameter setting unit 812 sets an image quality parameter of the image of the field region. For example, the image quality parameter setting unit 812 may be configured to allow the image quality to be selected from three levels, namely, a high quality, a standard quality, and a low quality, and be able to set a desired image quality among them based on an operation performed by the user.

The update rate determination unit 813 determines the update frame rate with respect to the image cut out by the background cutout unit 416 based on the image quality parameter set by the image quality parameter setting unit 812. The transmission frame rate at the transmission unit 417 is also changed according to the update frame rate determined here. For example, when the high quality is set as the image quality parameter, the update rate determination unit 813 determines that the transmission/update frame rate is 1 fps to transmit uncompressed background image data without delay. The update frame rate may be determined by the update rate determination unit 813 calculating it based on the image quality set by the image quality parameter setting unit 812, or may be directly specified by the image quality parameter setting unit 812.

In this manner, according to the present embodiment, the image processing system becomes able to adaptively adjust the transmission/update frame rate of the background image data of each of the background regions according to the required image quality.

Other Embodiments

The image processing system has been described referring to the example in which the foreground image is generated from the images captured by the 16 cameras 111a to 111p and the background image is generated from the images captured by the 6 cameras 111q to 111v in the above description, but the numbers of cameras are not limited to these examples. Increasing the number of cameras for capturing the foreground image so as to image the imaging region from further more directions allows the three-dimensional shape data of the foreground object to be further accurately generated, thereby allowing the generated virtual viewpoint video image to also have a high quality as a result thereof. On the other hand, as the number of cameras for capturing the background image increases, the brightness and the hue more likely become patchy in the background image acquired by combining the images. Therefore, it is desirable to use the minimum number of cameras that can maintain the required image quality, regarding the cameras for imaging the background region.

However, the intended result can be further effectively achieved by configuring the image processing system to include dedicated cameras for imaging each of the different background regions such as the spectator seats, the filed 101, and the sky as described in the above-described embodiments, instead of simply reducing the number of cameras. Configuring the image processing system in this manner allows the image that the user feels less strange to be presented as the background image acquired by combining the images as a whole even if the brightness and the hue are different among the images captured by the respective cameras. In other words, the intended result can be achieved by configuring the image processing system to capture the images with the minimum number of cameras that can maintain the required image quality for each of the plurality of different types of background regions.

Further, the image processing system has been described referring to the example in which the camera parameter is set so as to allow the camera for imaging the background region to have a wider angle of view than the camera for imaging the foreground region in the above description, but a dedicated camera covering a wide angle of view may be used for imaging the background region.

Further, the image processing system has been described referring to the example in which the spectator seats, the field 101, and the sky are imaged as the background regions in the above description, but another background region may be added thereto or a part of the regions may be excluded from the imaging target. For example, the sky can fulfill its purpose as long as it can suggest whether the game is played in the daytime or at night, and the image processing system may be configured to refrain from actually imaging the sky when image data prepared in advance is usable as a substitute.

Further, the image processing system has been described referring to the example in which the system is constructed by providing the dedicated cameras 111*a* to 111*p* for capturing the foreground image and the dedicated cameras 111*q* to 111*v* for capturing the background image in the above description. However, a part of the cameras may be used to generate both the foreground image and the background image. For example, the image processing system may be configured to generate not only the background image but also the foreground image from the captured image acquired by the camera 111*u* for imaging the field region. Alternatively, the image processing system may also be configured to generate the foreground image and the background image only with respect to imaging apparatuses of a partial few cameras among the plurality of cameras without including the dedicated cameras for the background image. The image processing system can also prevent the generation of the patchy background image due to the combination of the background images by using a smaller number of background images than the number of foreground images in this manner. Further, the image processing system can distribute and reduce the processing load on the camera adapter 120 because all the captured images are prevented from being used to generate both the foreground image and the background image.

In this manner, in the above-descried embodiments, a second imaging apparatus group for imaging the background region is set up in addition to a first imaging apparatus group for imaging the foreground object such as the player and the referee from the plurality of directions in the stadium that is the imaging target region. Then, the image processing system according to the present embodiments generates the foreground image containing the foreground object based on an image captured by an imaging apparatus contained in the first imaging apparatus group. On the other hand, an imaging range of each of imaging apparatuses contained in the second imaging apparatus group is wider than an imaging range of each of imaging apparatuses contained in the first imaging apparatus group, and the image processing system generates the background image not containing the foreground object based on an image captured by each of the imaging apparatuses contained in the second imaging apparatus group. Then, the image processing system generates the virtual viewpoint image according to the virtual viewpoint based on these generated foreground image and background image.

According to the present invention, at least one of the above-described issues can be solved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-097145, filed May 23, 2019, which is hereby incorporated by reference herein in its entirety.

What is claimed is:
1. An image processing system comprising:
 a first generation device configured to generate a foreground image including a foreground object based on an image of an imaging region captured by a first imaging apparatus and configured to transmit the foreground image at a first frame rate, the foreground image being used for generating a virtual viewpoint image;

a second generation device configured to generate a part image—corresponding to a part of an image of an imaging region captured by a second imaging apparatus different from the first imaging apparatus, configured to transmit the part image at a second frame rate lower than the first frame rate, and configured to control not to transmit an image which corresponds to another part of the image of the imaging region captured by the second imaging apparatus and which is different from the part image, the part image being used for determining a color of a background region in the virtual viewpoint image to be generated;

a third generation device configured to generate another part image corresponding to a part of an image of an imaging region captured by a third imaging apparatus different from the first imaging apparatus and the second imaging apparatus, configured to transmit said another part image at a third frame rate lower than the first frame rate and the second frame rate, and configured to control not to transmit an image which corresponds to another part of the image of the imaging region captured by the third imaging apparatus and which is different from said another part image, said another part image being used for determining a color of a background region in the virtual viewpoint image to be generated; and an image generation device configured to generate the virtual viewpoint image according to a virtual viewpoint based on the foreground image generated by the first generation device, the part image generated by the second generation device and said another part image generated by the third generation device.

2. The image processing system according to claim 1, wherein a plurality of imaging apparatuses included in a first imaging apparatus group which contains the first imaging apparatus and does not contain the second imaging apparatus are set up so as to be able to capture a region in the imaging region where the foreground object is placed, from a plurality of directions, and wherein one or more imaging apparatuses included in a second imaging apparatus group which contains the second imaging apparatus and does not contain the first imaging apparatus are set up so as to be able to capture a region that is a background, in the imaging region.

3. The image processing system according to claim 1, wherein an imaging range of the second imaging apparatus is wider than an imaging range of the first imaging apparatus.

4. The image processing system according to claim 1, wherein the imaging region captured by the second imaging apparatus comprises a stadium containing at least a field and spectator seats.

5. The image processing system according to claim 4, wherein a plurality of imaging apparatuses included in a first imaging apparatus group which contains the first imaging apparatus and does not contain the second imaging apparatus is set up so as to be able to image the foreground object in the field from a plurality of directions.

6. The image processing system according to claim 4, wherein an imaging apparatus for imaging the field and an imaging apparatus for imaging the spectator seats are included in a second imaging apparatus group which contains the second imaging apparatus and does not contain the first imaging apparatus.

7. The image processing system according to claim 6, wherein a plurality of part images includes a part image of the field that is generated based on the image captured by the imaging apparatus for imaging the field and a part image of the spectator seats that is generated based on the image captured by the imaging apparatus for imaging the spectator seats.

8. The image processing system according to claim 1, wherein the first generation device is connected to the first imaging apparatus, and wherein the second generation device is connected to the second imaging apparatus.

9. The image processing system according to claim 8, further comprising a foreground processing server configured to generate shape data representing a shape of the foreground object based on a plurality of foreground images transmitted from a plurality of first generation devices respectively connected to a plurality of imaging apparatuses included in a first imaging apparatus group which contains the first imaging apparatus and does not contain the second imaging apparatus, and wherein the image generation device is configured to generate the virtual viewpoint image based on the generated shape data.

10. The image processing system according to claim 8, further comprising a background processing server configured to generate data for coloring the background region based on a plurality of part images transmitted from a plurality of second generation devices respectively connected to a plurality of imaging apparatuses included in a second imaging apparatus group which contains the second imaging apparatus and does not contain the first imaging apparatus, and wherein the image generation device is configured to generate the virtual viewpoint image based on the generated data to the background region.

11. The image processing system according to claim 1, wherein the foreground object includes at least any of a player, a ball, and a referee.

12. The image processing system according to claim 1, wherein the second generation device does not generate the image which corresponds to another part of the image of the imaging region captured by the second imaging apparatus and which is different from the part image.

13. The image processing system according to claim 1, wherein the first generation device generates, based on the image of the imaging region captured by the imaging apparatus, a background image different from the part image which is generated by the second generation device.

14. The image processing system according to claim 13, wherein the background image generated by the first generation device is not transmitted from the first generation device.

15. The image processing system according to claim 1,
wherein a plurality of first generation devices respectively connected to a plurality of imaging apparatuses included in a first imaging apparatus group which contains the first imaging apparatus and does not contain the second imaging apparatus is connected via a first daisy chain, and wherein a plurality of second generation devices respectively connected to a plurality of imaging apparatuses included in the second imaging apparatus group which contains the second imaging apparatus and does not contain the first imaging apparatus is connected via a second daisy chain different from the first daisy chain.

16. The image processing system according to claim 1, wherein the first generation device and the second generation device are connected via a daisy chain.

17. The image processing system according to claim 1, wherein the imaging region captured by the second imaging apparatus comprises spectator seats in a stadium.

18. The image processing system according to claim 1, further comprising a background processing server configured to generate data for coloring the background region based on the part image transmitted from the second generation device and said another part image transmitted from the third generation device, wherein
  the image generation device is configured to generate the virtual viewpoint image further based on the generated data for coloring the background region.

19. The image processing system according to claim 1,
wherein the foreground image transmitted by the first generation device comprises information for specifying a first transmission destination, and
wherein the part image transmitted by the second generation device comprises information for specifying a second transmission destination different from the first transmission destination.

20. An image processing method comprising:
generating a foreground image including a foreground object based on an image of an imaging region captured by a first imaging apparatus, the foreground image being used for generating a virtual viewpoint image;
transmitting the generated foreground image at a first frame rate,
generating a part image corresponding to a part of an image of the imaging region captured by a second imaging apparatus different from the first imaging apparatus, the part image being used for determining a color of a background region in the virtual viewpoint image to be generated;
transmitting the generated part image at a second frame rate lower than the first frame rate;
generating another part image corresponding to a part of an image of an imaging region captured by a third imaging apparatus different from the first imaging apparatus and the second imaging apparatus; and
generating the virtual viewpoint image according to a virtual viewpoint based on the transmitted foreground image, the transmitted part image and the transmitted another part image.

21. A non-transitory computer-readable storage medium storing a computer program which, when run on a computer, causes the computer to carry out an image processing method comprising:
generating a foreground image including a foreground object based on an image of an imaging region captured by a first imaging apparatus, the foreground image being used for generating a virtual viewpoint image;
transmitting the generated foreground image at a first frame rate,
generating a part image corresponding to a part of an image of the imaging region captured by a second imaging apparatus different from the first imaging apparatus, the part image being used for determining a color of a background region in the virtual viewpoint image to be generated;
transmitting the generated part image at a second frame rate lower than the first frame rate;
generating another part image corresponding to a part of an image of an imaging region captured by a third imaging apparatus different from the first imaging apparatus and the second imaging apparatus; and
generating the virtual viewpoint image according to a virtual viewpoint based on the transmitted foreground image, the transmitted part image and the transmitted another part image.

22. An image processing system comprising:
a first generation device configured to generate a foreground image including a foreground object based on an image of an imaging region captured by a first imaging apparatus and configured to transmit the foreground image, the foreground image being used for generating a virtual viewpoint image;
a second generation device configured to generate a part image corresponding to a part of an image of an imaging region captured by a second imaging apparatus different from the first imaging apparatus, configured to transmit the part image, and configured to control not to transmit an image which corresponds to another part of the image of the imaging region captured by the second imaging apparatus and which is different from the part image, the part image being used for determining a color of a background region in the virtual viewpoint image to be generated;
a foreground processing server configured to receive the foreground image transmitted from the first generation apparatus, configured to generate shape data representing a shape of the foreground object based on the received foreground image, and configured not to receive the part image transmitted from the second generation device;
a background processing server configured to receive the part image transmitted from the second generation device, configured to generate data for coloring the background region based on the received part image, and configured not to receive the foreground image transmitted from the first generation apparatus; and
an image generation device configured to generate the virtual viewpoint image according to a virtual viewpoint based on the foreground image generated by the first generation device and the part image generated by the second generation device.

23. The image processing system according to claim 22,
wherein the first generation apparatus transmits the foreground image via a first daisy chain, and
wherein the second generation device transmits the part image via a second daisy chain different from the first daisy chain.

24. The image processing system according to claim 22,
wherein the first generation apparatus transmits the foreground image via a daisy chain, and
wherein the second generation device transmits the part image via the daisy chain via which the first generation apparatus transmits the foreground image.

25. An image processing system comprising:
a first generation device configured to generate a foreground image including a foreground object based on an image of an imaging region captured by a first imaging apparatus and configured to transmit the foreground image, the foreground image being used for generating a virtual viewpoint image;
a second generation device configured to generate a part image corresponding to a part of an image of an imaging region captured by a second imaging apparatus different from the first imaging apparatus, configured to transmit the part image, and configured to control not to transmit an image which corresponds to another part of the image of the imaging region captured by the second imaging apparatus and which is different from the part image, the part image being used for determining a color of a background region in the virtual viewpoint image to be generated;

a foreground processing server configured to receive the foreground image transmitted from the first generation apparatus, and configured to generate shape data representing a shape of the foreground object based on the received foreground image;

a background processing server configured to receive the part image transmitted from the second generation device, and configured to generate data for coloring the background region based on the received part image; and an image generation device configured to generate the virtual viewpoint image according to a virtual viewpoint based on the foreground image generated by the first generation device and the part image generated by the second generation device, wherein the foreground image transmitted by the first generation device comprises information for specifying the foreground processing server as a transmission destination, and wherein the part image transmitted by the second generation device comprises information for specifying the background processing server as a transmission destination.

* * * * *